United States Patent
Mathur et al.

[11] Patent Number: 5,351,044
[45] Date of Patent: Sep. 27, 1994

[54] VEHICLE LANE POSITION DETECTION SYSTEM

[75] Inventors: Bimal P. Mathur; H. Taichi Wang, both of Thousand Oaks, Calif.; Richard S. Haendel, Iowa City, Iowa

[73] Assignee: Rockwell International Corporation, Seal Beach, Calif.

[21] Appl. No.: 928,819

[22] Filed: Aug. 12, 1992

[51] Int. Cl.$^5$ .......................... G08G 1/00; G06K 9/68
[52] U.S. Cl. ..................................... 340/901; 340/903; 340/937; 340/942; 340/436; 340/687; 382/34; 382/35; 382/65; 348/135
[58] Field of Search ................. 340/901, 937, 903–905, 340/942, 436, 437, 555, 556, 687; 358/108, 110, 125, 213.15, 213.27; 382/30, 67, 48, 65, 34, 35; 348/135, 143, 148, 149

[56] References Cited

U.S. PATENT DOCUMENTS

| | | | |
|---|---|---|---|
| 4,348,652 | 9/1982 | Barnes et al. | 340/904 |
| 4,779,095 | 10/1988 | Guerreri | 340/901 |
| 4,833,469 | 5/1989 | David | 340/903 |
| 4,931,937 | 6/1990 | Kakinami et al. | 340/937 |
| 4,970,653 | 11/1990 | Kenue | 364/461 |
| 5,026,153 | 6/1991 | Suzuki et al. | 340/903 |
| 5,062,000 | 10/1991 | Harris et al. | 358/213.27 |

FOREIGN PATENT DOCUMENTS

| | | |
|---|---|---|
| 0517097 | 12/1992 | European Pat. Off. |
| 0527665 | 2/1993 | European Pat. Off. |

OTHER PUBLICATIONS

Hutchinson et al., "Computing Motion Using Analog and Binary Resistive Networks," *Computer*, pp. 52–63, Mar. 1988.

J. G. Harris, S. C. Liu, and B. Mathur, "Discarding Outliers Using a Nonlinear Resistive Network," International Conference on Neural Networks (IEEE), vol. 1, pp. 501–506, Jul. 8, 1991.

*Primary Examiner*—Donnie L. Crosland
*Attorney, Agent, or Firm*—John C. McFarren

[57] ABSTRACT

A low cost, real time vehicle lane position detection system is provided for determining and maintaining the position of the vehicle on a highway. The system comprises an image sensor mounted on the front of an automotive vehicle and an integrated processor for performing real-time lane mark detection. The sensor/processor system identifies highway lane marks on the detector image plane by using a nonlinear resistive network for detecting outliers. A line detection algorithm, such as the Hough transform, is used to determine the lane marks from the outliers on the image plane. Because the expected lane position can be determined in advance, an added degree of signal-to-noise discrimination is achieved by providing feedback to the processor for outlier detection. The position of the vehicle in the lane is determined and tracked from the position of the detected lane marks on the image plane given the sensor position and optical geometry.

13 Claims, 3 Drawing Sheets

VEHICLE LANE POSITION DETECTION SYSTEM

TECHNICAL FIELD

The present invention relates to moving vehicle sensor systems and, in particular, to a low cost, real time highway lane position detection system for automotive vehicles.

BACKGROUND OF THE INVENTION

Reducing congestion on the highways has been a goal for many years. One possible solution is to make existing highways more efficient through automation. To be safe and effective, however, automated highways require means for positioning vehicles within lanes as well as maintaining optimum distance between vehicles. Therefore, fully automated highway systems require sensor and data processing systems to detect and control the positions of moving vehicles.

Positioning vehicles on an automated highway, such as the proposed Intelligent Vehicle Highway System (IVHS), is complicated by the clutter of unwanted information from the environment that is continually received by the sensor system. Provisions must be made for system calibration, changing weather, vehicles entering and exiting the highway, and numerous other obstacles that might be encountered. Various systems have been proposed for automated highways, including those employing active sensors such as mm wave radar, laser radar, or sonar, and passive systems such as stereo vision for measuring distance between vehicles. The known systems, however, have high cost factors and/or technical problems that have not been overcome. For example, a wide field of view is needed for lane detection, and a highly resolved image with many pixels currently cannot be processed in real time. Given the foregoing constraints and the desire to develop automated highways, there is a need for a safe, effective, low cost, real time system for sensing and controlling the position of automotive vehicles in lanes of present highways and automated highways of the future.

SUMMARY OF THE INVENTION

The present invention comprises a vehicle lane position detection system for use on present roads as well as automated highways of the future. The lane position detection system comprises an image sensor mounted on the front of an automotive vehicle and a computer processor for performing real-time lane mark detection, tracking, and warning. The sensor/processor system detects the location of highway lane marks on the detector imaging plane by using a nonlinear resistive network to detect pixels in the image that have a higher output (i.e., outlier) compared to surrounding pixels. Line detection algorithms, such as the Hough transform, are used to determine the lane position from the outliers on the image plane. Because the desired lane position can be estimated in advance, an added degree of signal-to-noise discrimination may be achieved by providing feedback to the processor. The position of the vehicle in the lane is then determined from the position of the detected lane marks on the image plane.

A principal object of the invention is to control and maintain the position of an automotive vehicle in a lane of a highway. A feature of the invention is an image sensor and processor system mounted on a vehicle for detecting and determining the position of highway lane marks. An advantage of the invention is a low cost, real time sensor system that determines the position of a moving vehicle within a lane of a highway. Use of the invention may be extended to controlling the position of a vehicle within a lane of an automated highway.

BRIEF DESCRIPTION OF THE DRAWINGS

For a more complete understanding of the present invention and for further advantages thereof, the following Detailed Description of the Preferred Embodiment makes reference to the accompanying Drawings, in which.

DETAILED DESCRIPTION OF THE PREFERRED EMBODIMENT

The present invention comprises a vehicle lane position detection system that can be used on present highways and is designed to be part of a comprehensive automated highway system. A significant problem to be overcome in this area is the very wide field of view needed for sensing the position of a vehicle in a lane. With a wide field of view, highly resolved images having many pixels are undesirable because they cannot be processed in real time given the current state of technology. Therefore, a vast amount of unwanted information and noise, resulting from changes in the weather and variations in lighting conditions, for example, must be separated from the critical lane position information.

Figure 1:
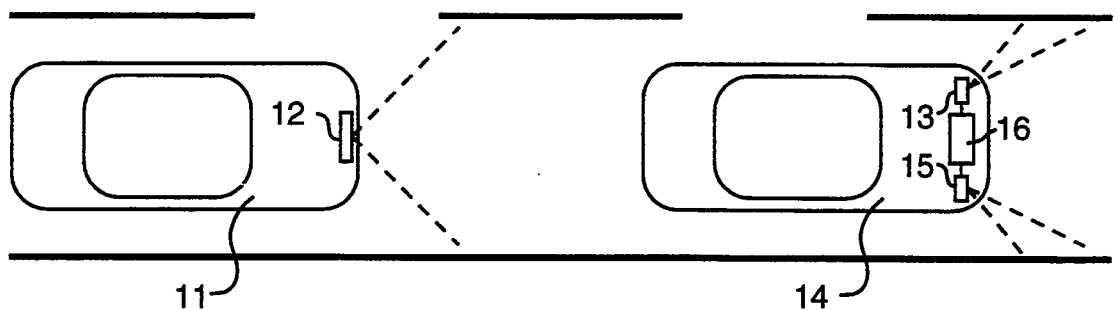
FIG. 1 is a schematic diagram of automobiles using a lane position detection system of the present invention on a highway.

The system of the present invention comprises an imaging system, such as a camera having an imaging array for lane mark detection, and a microprocessor. The imaging array typically comprises optics and an integrated chip that are mounted on the front of an automotive vehicle for lane mark detection. As illustrated in FIG. 1, an integrated detector 12 can be mounted centrally on the front (e.g., on the hood) of a vehicle 11. Detector 12 is designed with a field of view large enough to detect lane marks on both sides of vehicle 11. With only one detector, a microprocessor can be integrated with detector 12. In an alternative embodiment, integrated detectors 13 and 15 can be mounted on either one or both sides of vehicle 14. With one detector (such as detector 15) mounted on the side of vehicle 14, the field of view includes the lane marks on only one side of the highway. With dual detectors, both detectors 13 and 15 can be connected to and served by a single microprocessor 16.

Detector 12 includes imaging optics, an integrated imaging array for lane mark detection, and circuitry for biasing and clock generation. Detector 12 provides output for both a smoothed image and a corresponding outlier map. The output may comprise analog or digital signals. For an analog output, the outlier map may be digitized using a commercially available image acquisition board. The digitized image may then be transferred from a frame buffer to random access memory (RAM) associated with the microprocessor, where computations such as lane finding and decision making take place. In a unified system, all detector and microprocessor circuitry is integrated on a single board inside the imaging camera.

Figure 2A:
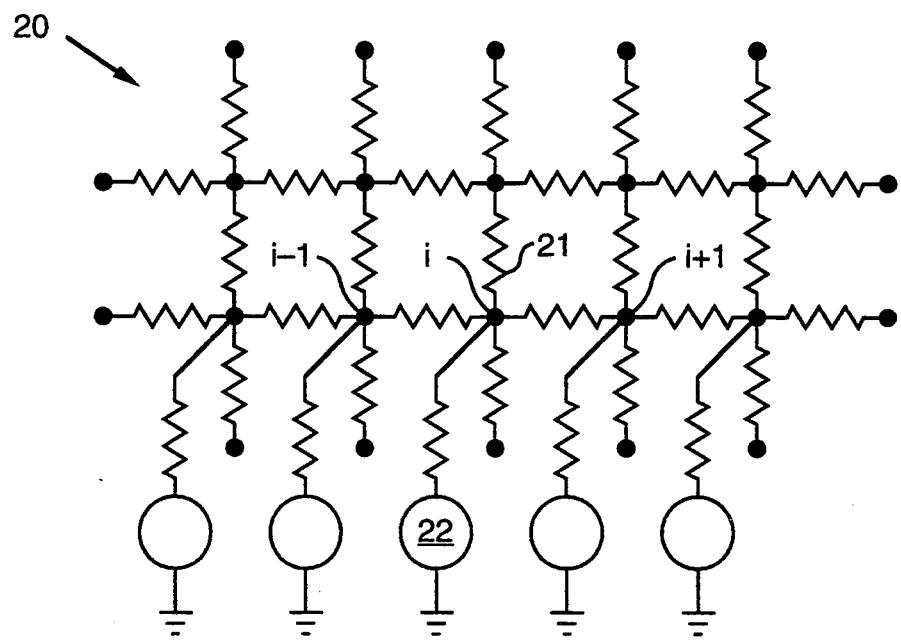
FIG. 2A is a schematic diagram of a resistive network as is known in the art of image smoothing.
Figure 2B:
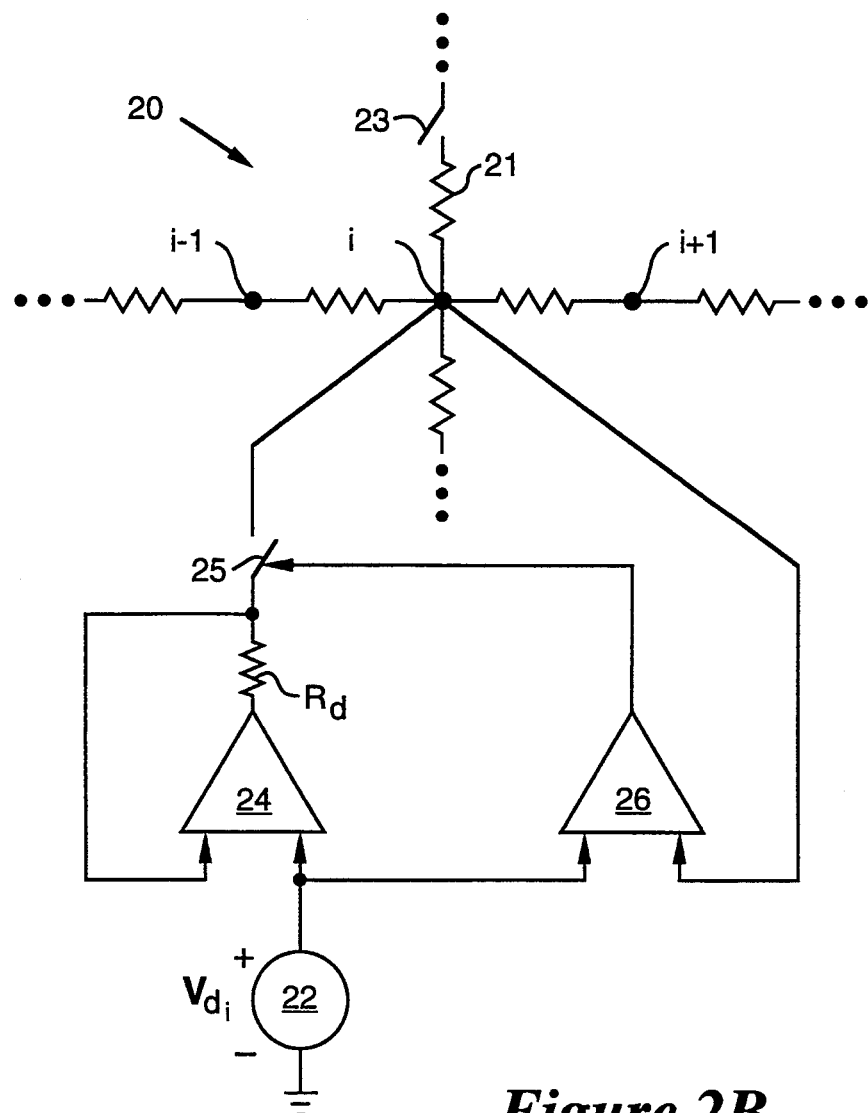
FIG. 2B is a schematic diagram of a nonlinear resistive network utilized by the system of the present invention to detect pixels in the sensor image that have a higher output (i.e., outliers) compared to surrounding pixels.

Referring to FIGS. 2A and 2B, a nonlinear resistive network 20 used for outlier detection includes an image plane comprising a grid of resistive elements (such as resistor 21 connected in series with switch 23), a transconductance amplifier 24 (which includes data path resistive element $R_d$), a switch 25, and a difference comparator 26 connected between each node i and its associated detector input, such as sensor element 22. Sensor element 22 comprises one of a plurality of sensor inputs, as from an imaging array, for example.

In operation, network 20 breaks one of the image plane resistive elements (i.e., opens switch 23) wherever a discontinuity occurs and breaks one of the data path resistive elements (i.e., opens switch 25) wherever an outlier occurs. Each image plane resistive element may comprise a resistive fuse or a saturating nonlinear resistor, for example. As illustrated in FIG. 2, the nonlinear resistive element in the data path comprises transconductance amplifier 24 and switch 25. Connected in series, transconductance amplifier 24 and switch 25 have a nonlinear, sigmoid-like I–V characteristic that is bounded by the operation of switch 25.

Switch 25 of network 20 is controlled by the difference comparator 26. Initially, all switches are closed (as illustrated in FIG. 2A) and the network smoothes the input data values from all the sensor elements. Comparator 26 then computes the difference between the input data value $V_{di}$ and the smoothed data value at node i. If the difference is greater than a threshold value then the data value at node i is an outlier and switch 25 is opened. As a result, the image data at node i is smoothed without input from sensor element 22. Highway lane marks are generally brighter than the road surface and appear in the image as outliers (i.e., points different from their immediate surroundings). The position of the outliers, which is important in the detection and identification of lane marks, is indicated by the position of the open switches, such as switch 25, in network 20.

In the present invention, the highway lane marks are detected as an outlier image by detector 12. After a frame of the outlier image is transferred to microprocessor RAM, the most likely parameters are computed for the line that goes through the detected lane marks. Based on the known camera position and optical geometry, actual lane boundaries on the highway are computed from the lane mark parameters on the image plane. This measurement process, however, is inherently noisy. A Kalman filter may be used to smooth and track the distance and orientation of the vehicle with respect to the actual lane boundaries. This data may be used to predict whether or not the vehicle is deviating from the desired lane position.

A well-known transform algorithm developed by Hough in 1962 can be used for finding the lane mark lines from the outlier images. The predicted intercept and angle of the Kalman filter and the previous prediction errors can be used to limit the search region in both the image area and the line parameter space in the current frame. The Hough transform can also provide a count of the pixels on which the lane marks (i.e., the outliers) have fallen. Based on the camera and highway geometry, an approximation of the number of pixels expected to be outliers is known. This information can be used to provide feedback signals for adjusting the final threshold voltage for outlier detection.

Figure 3:
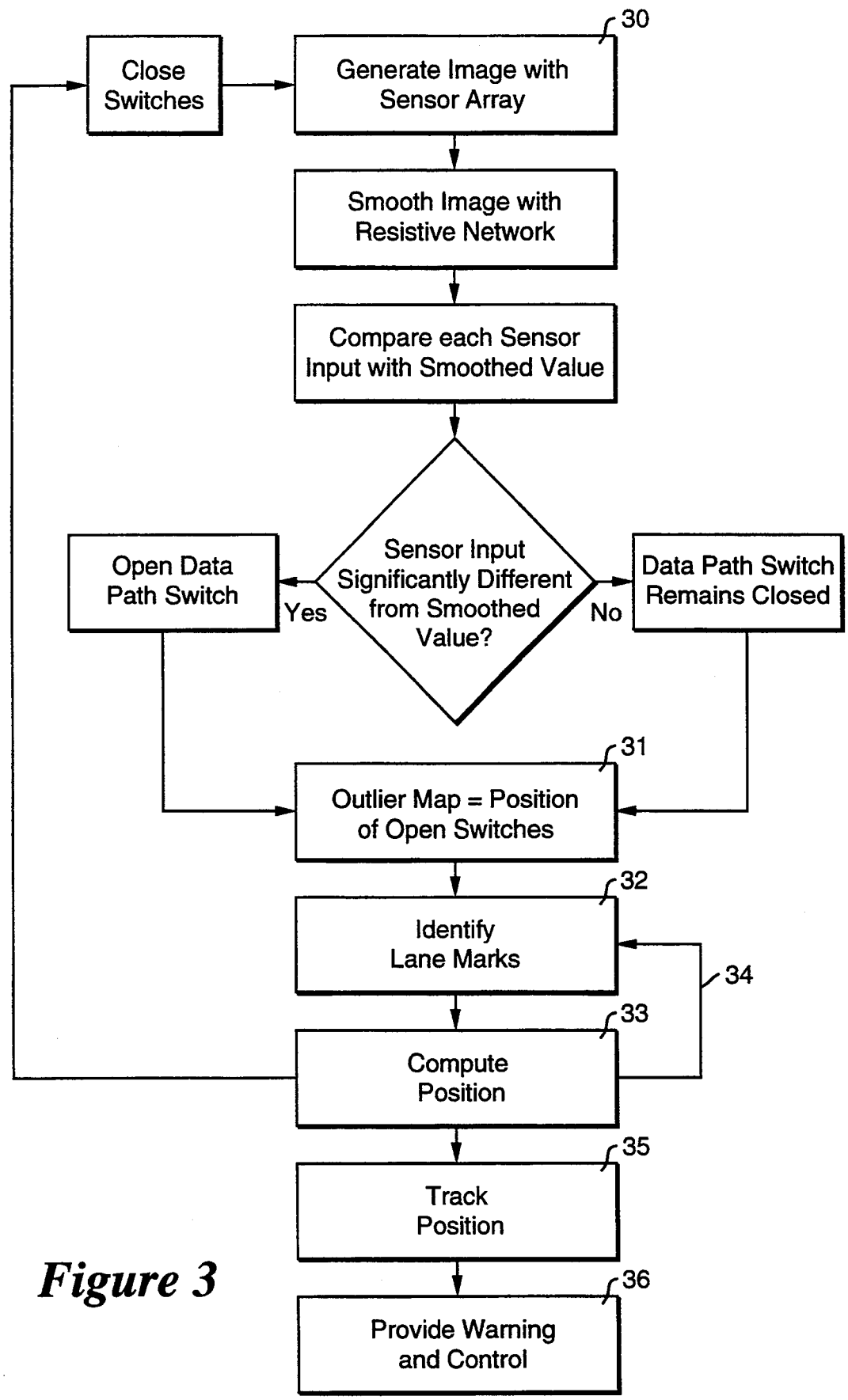
FIG. 3 is a flow diagram illustrating major functions and flow of information in the lane position detection system of the present invention.

FIG. 3 illustrates the basic functions of the present invention in block diagram form. The sensor system, which may include optics and a detector array 12 mounted on vehicle 11 as described above, generates an image 30 of the highway ahead of the vehicle. Nonlinear resistive network 20 detects outliers 31 that are analyzed for the presence of highway lane marks 32. The microprocessor computes the position 33 of the vehicle in the lane based on the detected lane marks 32 and the known geometry and position of the sensor system. The known sensor geometry and expected lane mark positions are used to provide feedback signals 34 to adjust the threshold voltage of network 20 for improved outlier detection and identification of lane marks 32. Analysis of subsequent image frames produces a series of data on lane position that is used for tracking 35 the position of the moving vehicle in the lane. Finally, the lane position tracking data may be provided to a warning and control system 36 to alert the driver of the vehicle and/or provide automatic steering corrections to maintain the position of the vehicle within the lane.

Although the present invention has been described with respect to specific embodiments thereof, various changes and modifications can be carded out by those skilled in the art without departing from the scope of the invention. Therefore, it is intended that the present invention encompass such changes and modifications as fall within the scope of the appended claims.

We claim:

1. A highway lane position detecting system for an automotive vehicle, comprising:

a sensor array comprising a plurality of sensor elements mounted on the vehicle for generating an image of the highway lane ahead of the vehicle, said image comprising data values input from said plurality of sensor elements;

a resistive network comprising a plurality of nodes connected to said sensor array for receiving said input data values and providing smoothed data values on said nodes;

a plurality of data paths, each of said data paths including a data path switch connecting one of said sensor elements to a corresponding network node;

means connected to each of said data paths for opening said data path switch when the difference between said sensor input data value and said smoothed data value on said corresponding node exceeds a predetermined value;

a microprocessor connected to said resistive network for determining position of said open switches in said image; and said microprocessor using said open switch positions in said image for computing and outputting data in real time indicating position of the vehicle in the highway lane.

2. The system of claim 1, wherein each of said switch opening means comprises a comparator, said comparator connected to receive data values from said sensor element and said corresponding network node.

3. A method of determining position of an automotive vehicle in a highway lane, comprising the steps of:

mounting a sensor array comprising a plurality of sensor elements on the vehicle;

generating an image of the highway lane ahead of the vehicle, said image comprising data values input from said plurality of sensor elements;

providing a resistive network having a plurality of nodes;

connecting each of said sensor elements to a corresponding node of said resistive network with a data path having a data path switch;

smoothing said input data values to provide smoothed data values on said nodes of said resistive network;

opening said data path switch in each of said data paths where the difference between said sensor input data value and said smoothed data value on said corresponding node exceeds a predetermined value;

determining position of said open switches in said image; and computing and outputting data in real time indicating position of the vehicle in the highway lane based on said open switch positions in said image.

4. The method of claim 3, further comprising the step of connecting a comparator to receive and compare data values from said sensor element and said corresponding network node and to open said data path switch.

5. The method of claim 3, wherein the step of computing and outputting data further comprises the step of performing a Hough transform.

6. The method of claim 5, wherein the step of computing and outputting data further comprises the step of providing feedback from said Hough transform for adjusting said predetermined value for opening said switches.

7. The method of claim 3, further comprising the step of tracking position of the vehicle in the highway lane.

8. The method of claim 7, further comprising the steps of monitoring and controlling position of the vehicle in the highway lane.

9. A method of determining position of an automotive vehicle in a highway lane, comprising the steps of:

mounting a sensor array comprising a plurality of sensor elements on the vehicle;

generating an image of the lane ahead of the vehicle from said sensor array, said image comprising data values input from said plurality of sensor elements;

connecting a resistive network to said sensor array with a plurality of data path switches, said resistive network comprising a plurality of nodes, each of said nodes connected to a corresponding one of said sensor elements by one of said data path switches;

smoothing said input data values to provide smoothed data values on said nodes;

opening corresponding ones of said data path switches when the difference between said smoothed data value on said node and said corresponding sensor input data value exceeds a predetermined value;

performing a transform to determine highway lane marks from the positions of said open data path switches in said image;

determining position of said highway lane marks in said image; and computing and outputting data in real time indicating position of the vehicle in the highway lane based on said highway lane mark position in said image.

10. The method of claim 9, wherein the step of performing a transform comprises the step of performing a Hough transform.

11. The method of claim 10, wherein the step of determining position of said highway lane marks in said image further comprises the step of providing feedback from said Hough transform for adjusting said predetermined value for opening said data path switches.

12. The method of claim 11, further comprising the step of tracking position of the vehicle in the highway lane.

13. The method of claim 12, further comprising the steps of monitoring and controlling position of the vehicle in the highway lane.

* * * * *